United States Patent
Bae

(10) Patent No.: US 10,271,016 B2
(45) Date of Patent: Apr. 23, 2019

(54) INTEGRATED MONITORING CCTV, ABNORMALITY DETECTION APPARATUS, AND METHOD FOR OPERATING THE APPARATUS

(71) Applicant: IVS TECHNOLOGY CORPORATION, Seoul (KR)

(72) Inventor: Young-Hoon Bae, Seoul (KR)

(73) Assignee: IVS TECHNOLOGY CORPORATION, Seoul (KR)

( * ) Notice: Subject to any disclaimer, the term of this patent is extended or adjusted under 35 U.S.C. 154(b) by 323 days.

(21) Appl. No.: 15/208,370

(22) Filed: Jul. 12, 2016

(65) Prior Publication Data

US 2017/0019639 A1 Jan. 19, 2017

(30) Foreign Application Priority Data

Jul. 19, 2015 (KR) .................. 10-2015-0101527
Jun. 29, 2016 (KR) .................. 10-2016-0081834

(51) Int. Cl.
*H04N 7/18* (2006.01)
*H04N 5/247* (2006.01)
(Continued)

(52) U.S. Cl.
CPC .............. *H04N 7/18* (2013.01); *G01L 23/26* (2013.01); *G06K 9/00771* (2013.01);
(Continued)

(58) Field of Classification Search
CPC .......... H04N 7/18; H04N 7/188; H04N 7/181; G06K 9/00771; G06K 9/00979;
(Continued)

(56) References Cited

U.S. PATENT DOCUMENTS 6,965,541 B2 * 11/2005 Lapin .................... G01S 3/8003
367/118
7,203,132 B2 * 4/2007 Berger ...................... G01S 5/20
367/124
(Continued)

FOREIGN PATENT DOCUMENTS

JP 2012-155653 A 8/2012
KR 10-0964846 B1 6/2010
(Continued)

OTHER PUBLICATIONS

Duckworth et al., Fixed and wearable acoustic counter-sniper systems for law enforcement, Nov. 5, 1998, pp. 1-22. (Year: 1998).*

*Primary Examiner* — Daniel Pihulic
(74) *Attorney, Agent, or Firm* — John P. White; Cooper & Dunham LLP

(57) ABSTRACT

Disclosed herein are an integrated monitoring CCTV, an abnormality detection apparatus, and a method for operating the apparatus. The abnormality detection apparatus includes a monitoring information collection unit for collecting monitoring information that includes location information, sound information and time information of a monitoring area from at least one integrated monitoring CCTV including multiple microphones; and an abnormal sound determination unit for determining whether an abnormality has occurred in the monitoring area, based on the sound information of the monitoring area, wherein the abnormality detection apparatus further comprises an explosion occurrence determination unit for, based on information about installation locations and installation directions of multiple integrated monitoring CCTVs transmitted from the multiple integrated monitoring CCTVs, generating a sensor matrix map for the multiple integrated monitoring CCTVs and calculating a location of occurrence of an abnormal sound based on the sensor matrix map when the abnormal sound occurs.

12 Claims, 11 Drawing Sheets

(51) Int. Cl.
*H04R 3/00* (2006.01)
*G01L 23/26* (2006.01)
*G06K 9/00* (2006.01)
G06K 9/62 (2006.01)
G08B 13/08 (2006.01)
G08B 13/196 (2006.01)

(52) U.S. Cl.
CPC ............ *H04N 7/181* (2013.01); *H04N 7/188* (2013.01); *H04R 3/005* (2013.01); *G06K 9/00979* (2013.01); *G06K 9/6289* (2013.01); *G06K 2009/00738* (2013.01); *G08B 13/08* (2013.01); *G08B 13/19695* (2013.01); *H04R 2430/20* (2013.01)

(58) Field of Classification Search
CPC ........ G06K 9/6289; G06K 2009/00738; G01L 23/26; H04R 3/005; H04R 2430/20; G08B 13/19695; G08B 13/08
See application file for complete search history.

(56) References Cited

U.S. PATENT DOCUMENTS

| | | | | |
|---|---|---|---|---|
| 7,586,812 B2* | 9/2009 | Baxter | ................... | F41H 13/00 367/127 |
| 8,369,184 B2* | 2/2013 | Calhoun | ............... | G01S 5/0205 367/118 |
| 2005/0088915 A1* | 4/2005 | Lapin | .................... | G01S 3/8003 367/118 |
| 2006/0239120 A1* | 10/2006 | Berkovich | .............. | G01S 11/12 367/128 |
| 2012/0300587 A1* | 11/2012 | Azimi-Sadjadi | ........ | G01S 11/14 367/127 |
| 2012/0307069 A1* | 12/2012 | Pierce | .................. | H04N 5/2252 348/159 |
| 2012/0327746 A1* | 12/2012 | Velusamy | ................. | G01S 5/22 367/127 |
| 2014/0368643 A1* | 12/2014 | Siegel | .............. | G08B 13/19695 348/143 |
| 2015/0062292 A1* | 3/2015 | Kweon | .............. | H04N 5/23238 348/37 |
| 2015/0319352 A1* | 11/2015 | Donovan | ......... | G08B 13/19645 348/159 |
| 2016/0042767 A1* | 2/2016 | Araya | .................... | G11B 19/02 386/201 |
| 2016/0240055 A1* | 8/2016 | Donovan | ......... | G08B 13/19645 |
| 2017/0019639 A1* | 1/2017 | Bae | .......................... | H04N 7/18 |

FOREIGN PATENT DOCUMENTS

| | | | |
|---|---|---|---|
| KR | 20100094103 A | 8/2010 | |
| KR | 10-1321447 B1 | 10/2013 | |
| KR | 10-1335428 B1 | 11/2013 | |
| KR | 101699445 B1 * | 1/2017 | ............... H04N 7/18 |

* cited by examiner

INTEGRATED MONITORING CCTV, ABNORMALITY DETECTION APPARATUS, AND METHOD FOR OPERATING THE APPARATUS

BACKGROUND OF THE INVENTION

1. Technical Field

The present invention generally relates to an integrated monitoring Closed Circuit Television (CCTV) and an abnormality detection apparatus and method and, more particularly, to an integrated CCTV, which can perform the detection of sound sources and the collection of information using sensors, as well as the collection of videos, in an integrated manner and to an abnormality detection apparatus and method, which can detect an abnormal situation based on the information collected from the integrated monitoring CCTV.

2. Description of the Related Art

For the protection of public or private property, various types of security systems, security devices, etc. have been developed and used. The systems that are most typically used include a video security system in which equipment, such as a CCTV, indicating a situation such as external intrusion, is installed in the place requiring security, and in which, when an external intrusion is detected through such equipment, a signal for the external intrusion is generated and transmitted to a manager such as a homeowner or a security company, after which the corresponding manager checks the signal.

Systems in which data communication or the like is combined and used with the above-described system using a rapidly developed wired/wireless communication network have been presented. Methods combined with network technology enable monitoring to be performed from a remote place using real-time video, and, in particular, situations occurring in all places where a monitoring camera or the like is installed may be observed in real time in an Internet-based environment.

However, the conventional CCTV is equipped with only a video recording function and has many blind spots, thus resulting in a technical limitation such as a limited control range. Further, an emergency bell device combined with an existing CCTV is limited in that it runs only when it is accessed and manually operated in an emergency situation, and thus the operation thereof may not be performed normally in the event of an emergency.

Accordingly, there is required the development of omni-directional sound detection analysis technology for supplementing blind spots. Furthermore, there is urgently required the development of an integrated CCTV having a sound control function and a warning broadcasting function, as well as video control technology performed by existing CCTVs.

PRIOR ART DOCUMENTS

Patent Documents (Patent Document 1) Korean Patent Application Publication No. 2010-0094103 (entitled "System and Method for Providing CCTV Image Information")

SUMMARY OF THE INVENTION

Accordingly, the present invention has been made keeping in mind the above technical problems occurring in a conventional CCTV, and an object of the present invention is to provide an integrated monitoring CCTV and an abnormality detection apparatus and method, which can perform the collection of CCTV videos, the detection of abnormal sound sources, and the collection of information using sensors.

Another object of the present invention is to provide an integrated monitoring CCTV and an abnormality detection apparatus and method, which can detect the situation of an explosion or a flying object such as a drone, and can provide notification of the presence of such an explosion or flying object.

In accordance with an aspect of the present invention to accomplish the above objects, there is provided an abnormality detection apparatus, including a monitoring information collection unit for collecting monitoring information that includes location information, sound information and time information of a monitoring area from at least one integrated monitoring Closed Circuit Television (CCTV) including multiple microphones; and an abnormal sound determination unit for determining whether an abnormality has occurred in the monitoring area, based on the sound information of the monitoring area, wherein the monitoring information includes information about an installation location and an installation direction of the integrated monitoring CCTV, and wherein the abnormality detection apparatus further includes an explosion occurrence determination unit for, based on information about installation locations and installation directions of multiple integrated monitoring CCTVs transmitted from the multiple integrated monitoring CCTVs, generating a sensor matrix map for the multiple integrated monitoring CCTVs and calculating a location of occurrence of an abnormal sound based on the sensor matrix map when the abnormal sound occurs.

In accordance with another aspect of the present invention to accomplish the above objects, there is provided an integrated monitoring Closed Circuit Television (CCTV) for monitoring a monitoring area by collecting video information and sound information of the monitoring area, the integrated monitoring CCTV including an information collection unit for collecting video information of the monitoring area and sound information occurring around the monitoring area; a monitoring information generation unit for generating monitoring information by adding information about times, at which the video information and the sound information are collected, to the video information and the sound information, and transmitting the monitoring information to an abnormality detection apparatus; and a warning broadcasting unit for broadcasting a warning when a warning signal is received from the abnormality detection apparatus, wherein the monitoring information further includes information about a location and a direction in which the integrated monitoring CCTV is installed.

In accordance with a further aspect of the present invention to accomplish the above objects, there is provided a method for operating an abnormality detection apparatus, including collecting monitoring information that includes location information, sound information and time information of a monitoring area from at least one integrated monitoring CCTV including multiple microphones; and determining whether an abnormality has occurred in the monitoring area, based on the sound information of the monitoring area, wherein the monitoring information includes information about an installation location and an installation direction of the integrated monitoring CCTV, and wherein the method further includes generating a sensor matrix map for the multiple integrated monitoring CCTVs, based on information about installation locations and installation directions of multiple integrated monitoring CCTVs transmitted from the multiple integrated monitoring CCTVs; and calculating a location of occurrence of an abnormal sound based on the sensor matrix map when the abnormal sound occurs.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
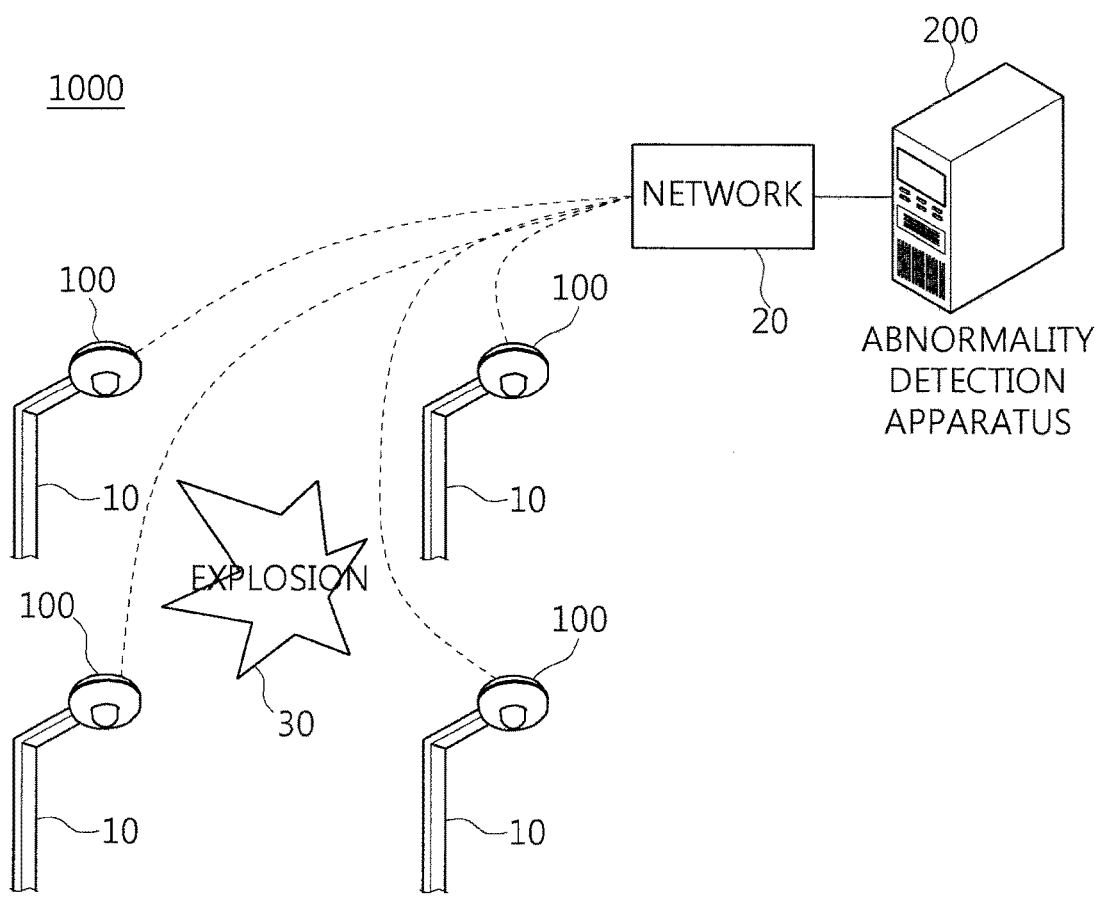
FIG. 1 is a conceptual diagram showing an abnormality detection system according to an embodiment of the present invention.

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clearer.

Hereinafter, an abnormality detection system 1000 according to an embodiment of the present invention will be described.

FIG. 1 is a conceptual diagram showing the abnormality detection system 1000 according to an embodiment of the present invention. As shown in FIG. 1, the abnormality detection system 1000 according to the embodiment of the present invention may be configured to include integrated monitoring CCTVs 100 and an abnormality detection apparatus 200 for detecting an abnormal situation via communication with the integrated monitoring CCTVs 100. That is, as shown in FIG. 1, when each integrated monitoring CCTV 100 transmits video information, sound information, time information, etc. to the abnormality detection apparatus 200 over a network 20, the abnormality detection apparatus 200 functions to determine, based on collected information, whether an abnormal situation has occurred in a monitoring area for the integrated monitoring CCTV, which has transmitted the information. Here, the types of abnormal situations may include a scream, a horn, a vehicle accident, breakage of a glass window, and an explosion, and may further include additional abnormal situations.

For this, the abnormality detection apparatus 200 according to an embodiment of the present invention may have determination sound data required to determine the types of abnormal situations. Accordingly, the abnormality detection apparatus 200 according to the embodiment of the present invention may determine the occurrence or non-occurrence of an abnormal situation, the type of abnormal situation, etc. by comparing the determination sound data with sound information transmitted from the integrated monitoring CCTV 100.

Further, the abnormality detection system 1000 according to the embodiment of the present invention is characterized in that the location at which an abnormal situation, such as an explosion, has occurred may be accurately detected. For example, the abnormality detection system 1000 according to the embodiment of the present invention includes multiple integrated monitoring CCTVs 100, which are individually arranged in a wide area and which may individually perform the functions of sensor networks.

As shown in FIG. 1, when an abnormal situation such as an explosion occurs at a specific point 30, integrated monitoring CCTVs 100 located near the specific point 30, that is, the corresponding explosion point, detect sound information attributable to the occurrence of the abnormal situation. Here, the integrated monitoring CCTVs, having detected the sound information, transmit the sound information, time information, and information about their locations together to the abnormality detection apparatus 200. Here, the abnormality detection apparatus 200 collects and combines pieces of information transmitted from multiple integrated monitoring CCTVs, and analyzes the collected and combined information, thus enabling the location where the abnormal situation has occurred to be searched for. Below, with reference to FIGS. 2 to 4, the integrated monitoring CCTVs 100 and the abnormality detection apparatus 200 according to the embodiment of the present invention will be described in detail.

Figure 2:
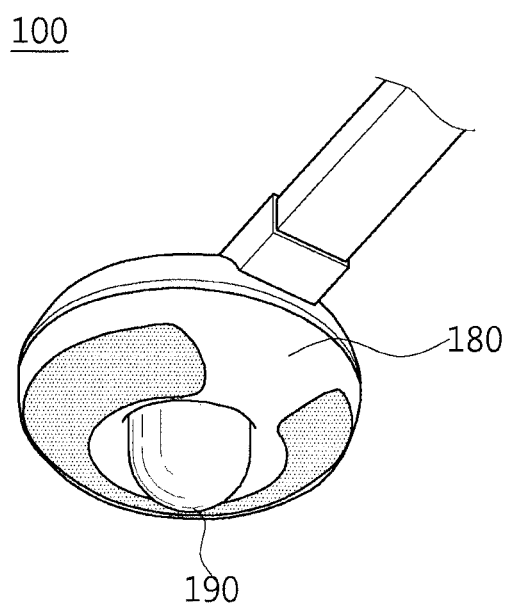
FIG. 2 is a perspective view showing an integrated monitoring CCTV according to an embodiment of the present invention.
Figure 3:
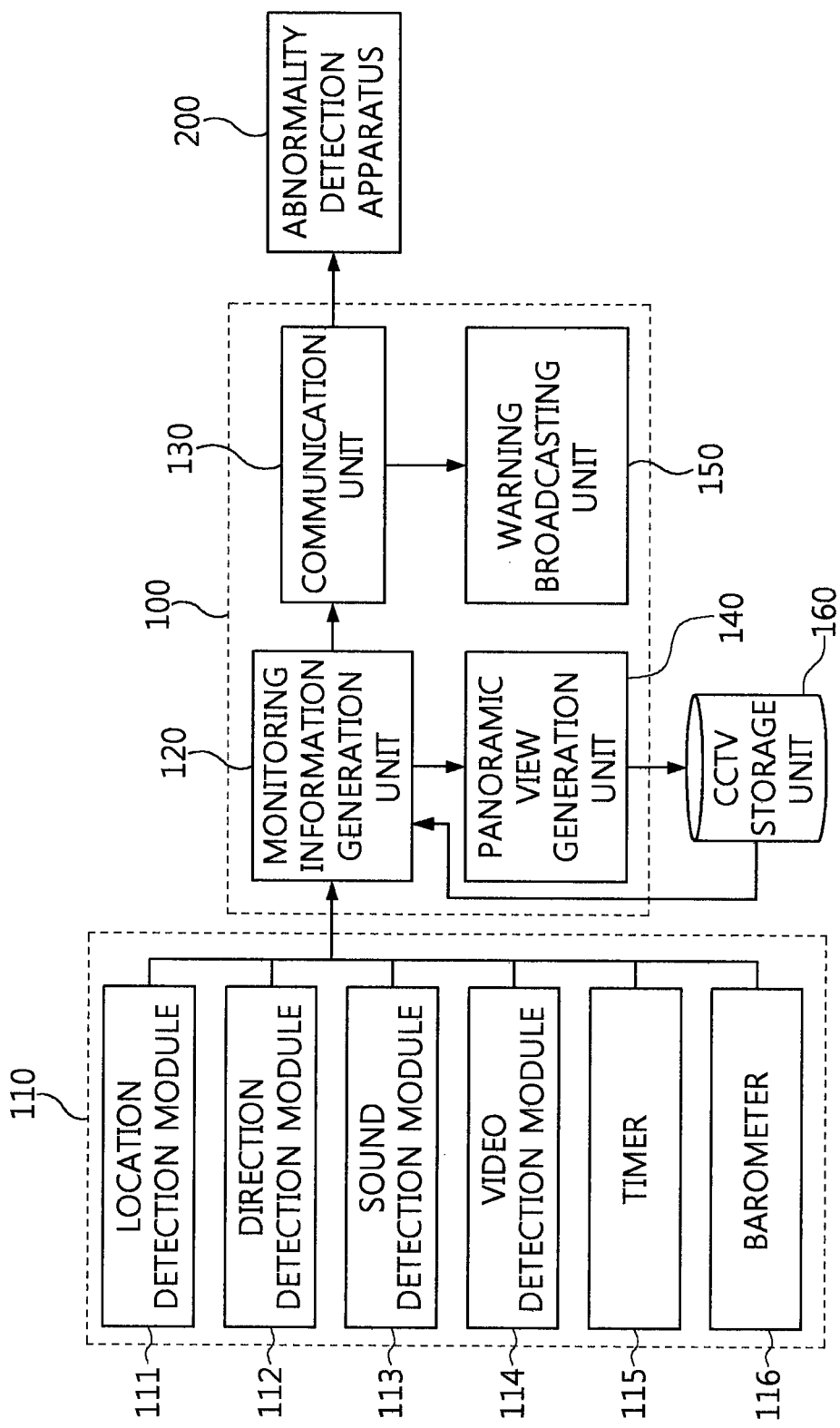
FIG. 3 is a block diagram showing an integrated monitoring CCTV according to an embodiment of the present invention.

First, the integrated monitoring CCTV 100 according to an embodiment of the present invention will be described in detail. FIG. 2 is a perspective view showing the integrated monitoring CCTV 100 according to an embodiment of the present invention. FIG. 3 is a block diagram showing the integrated monitoring CCTV 100 according to an embodiment of the present invention. As shown in FIG. 2, the main body of the integrated monitoring CCTV 100 according to the embodiment of the present invention may be configured to include a housing 180 and a lens part 190 enclosing a camera. Further, the integrated monitoring CCTV 100 may include multiple microphones (not shown) arranged around the lens part, and may be coupled to an existing CCTV pole or the like through a fixing bracket. Below, the functions performed by the integrated monitoring CCTV 100 according to the embodiment of the present invention will be described with reference to FIG. 3.

As shown in FIG. 3, the integrated monitoring CCTV 100 according to the embodiment of the present invention may be configured to include a detected information collection unit 110, a monitoring information generation unit 120, a communication unit 130, a panoramic view generation unit 140, a warning broadcasting unit 150, and a CCTV storage unit 160. Here, to facilitate description of the present invention, the monitoring information generation unit 120 and the panoramic view generation unit 140 are defined as being distinguished from each other based on their functions. That is, the monitoring information generation unit 120 and the panoramic view generation unit 140 may also be operated as a single processing device, such as a Central Processing Unit (CPU) or a mobile processor.

The detected information collection unit 110 functions to collect pieces of information of the monitoring area in which the integrated monitoring CCTV 100 is installed. Here, the information of the monitoring area may include sound information and video (image) information. As described above, a conventional CCTV has only a video recording function, and has a large number of blind spots, thus having a greatly limited control range. Furthermore, an emergency bell device coupled to the existing CCTV is configured to run only when a pedestrian who feels threatened accesses and operates the emergency bell in the event of an emergency. Accordingly, there is a limitation in that the emergency bell may not be operated as desired in the event of an actual emergency.

Accordingly, the integrated monitoring CCTV 100 according to the embodiment of the present invention collects sound information and transmits the collected sound information to the abnormality detection apparatus 200, which will be described later, thus allowing the occurrence of an abnormal situation to be determined. That is, the abnormality detection apparatus 200 may include determination sound data required to identify a scream, a horn, a vehicle accident, breakage of a glass window, and an explosion, and may determine whether an abnormal situation has occurred in the monitoring area of the corresponding integrated monitoring CCTV 100 by comparing the determination sound data with sound information.

In order to perform the above-described function, the detected information collection unit 110 may be configured to include a sound detection module 113 and a video detection module 114. The sound detection module 113 is provided with multiple microphones in order to function to collect sound information. The video detection module 114 includes multiple cameras in order to function to collect video information. Here, the reason for configuring multiple microphones is to track the direction in which sounds are originated. That is, the detected information collection unit 110 may extract the direction of sounds using an azimuth angle and an angle of altitude, as well as the detection of sounds through multiple microphones. Since methods for deriving the direction of sounds using multiple microphones are well known, an additional description thereof will be omitted. Further, in the above description, multiple microphones and multiple cameras may also be designed to be integrated into a single module.

Further, the cameras are preferably implemented as wide-angle cameras. That is, the cameras included in the video detection module 114 according to the embodiment of the present invention may secure a viewing angle ranging from 120 degrees to 240 degrees. Meanwhile, for such cameras, a single pan-tilt-zoom (PTZ) camera may be additionally applied. Here, an inexpensive video detection module may be implemented as software PTZ using a dual camera rather than using a PTZ camera, and an expensive video detection module may be implemented using an existing PTZ camera. In addition, a fisheye lens may be applied to each camera.

Further, the detected information collection unit 110 may be configured to include a timer 115. The reason for this is to allow the monitoring information generation unit 120, which will be described later, to generate monitoring information and to allow the abnormality detection apparatus 200 to accurately check the time at which the information is collected by the detected information collection unit 110.

The monitoring information generation unit 120 functions to aggregate pieces of information collected by the detected information collection unit 110 and to generate monitoring information. Here, the monitoring information may include information about the installation location at which and the installation direction in which each integrated monitoring CCTV 100 is installed. The reason for this is to detect the location at which an explosion has occurred when the explosion occurs, as will be described later. This operation will be described later with reference to FIG. 5.

The monitoring information generated in this way is transmitted to the abnormality detection apparatus 200 through the communication unit 130. The monitoring information generated by the monitoring information generation unit 120 may be transmitted to the abnormality detection apparatus 200 in real time. The abnormality detection system according to the embodiment of the present invention is advantageous in that it may detect an abnormal situation in a timely manner and may enable response to an abnormal situation.

The panoramic view generation unit 140 functions to convert an image included in the video information into a 360° panoramic view image using a software correction technique. Here, it is difficult to transmit, in real time, the panoramic view image to the abnormality detection apparatus 200 due to the high band thereof. Accordingly, the integrated monitoring CCTV 100 according to the embodiment of the present invention transmits the video information acquired by the video detection module 114 in real time to the abnormality detection apparatus 200, wherein the panoramic view image generated through the panoramic view generation unit 140 is stored in the CCTV storage unit 160 and is transmitted to the abnormality detection apparatus only if necessary. Accordingly, the integrated monitoring CCTV 100 according to the embodiment of the present invention may be used to detect an abnormal situation using the detection of sounds and may inquire about the video of a camera blind spot using the panoramic view image, in order to solve the problem with the conventional CCTV.

The warning broadcasting unit 150 functions to broadcast a warning when a warning signal is received from the abnormality detection apparatus 200. For this, the warning broadcasting unit 150 may be configured to include at least one speaker.

Further, as described above, the abnormality detection system 1000 according to the embodiment of the present invention is characterized in that it may detect an abnormal situation, such as an explosion, and may check the location of the abnormal situation. That is, when an explosion or the like occurs, a sound signal having a relatively high level is produced and is detected by multiple integrated monitoring CCTVs 100. When pieces of detected information are aggregated, whether and where an explosion has occurred may be further determined.

Accordingly, the detected information collection unit 110 in the integrated monitoring CCTV 100 according to the embodiment of the present invention may be configured to include a location detection module 111 and a direction detection module 112. Here, the location detection module 111 may be configured to include a Global Positioning System (GPS), a Geographical Information System (GIS), or the like, and functions to generate information about the installation location where the integrated monitoring CCTV 100 is installed. Of course, in the case of the installation location information, a scheme for storing the information in the CCTV storage unit 160 in advance and utilizing the stored information, as well as a scheme for including information about devices (CCTVs), may be implemented. Further, the direction detection module 112 may be configured to include a gyro sensor or the like, and may include information about the installation direction of the integrated monitoring CCTV 100. Here, similar to the installation location information, a scheme for storing installation direction information in the CCTV storage unit 160 in advance and utilizing the stored information is also possible.

The installation location information and installation direction information generated in this way may be included in the monitoring information by the monitoring information generation unit 120, and may be transmitted to the abnormality detection apparatus 200.

Further, in the case of an explosion, atmospheric pressure around an explosion originating point changes while forming a circle when an explosion occurs. Accordingly, the detected information collection unit 110 of the integrated monitoring CCTV 100 according to the embodiment of the present invention may be configured to further include a barometer 116. Similar to the above-described installation location information and installation direction information, the atmospheric pressure information detected by the barometer 116 may be further included in the monitoring information by the monitoring information generation unit 120.

Further, the above-described atmospheric pressure information may be used not only to determine the occurrence of an explosion when an explosion occurs but also to detect an intrusion into a building, such as a house or an office. That is, in an indoor space, the opening/closing of doors and the opening/closing of windows may cause a minute change in atmospheric pressure. Accordingly, the barometer 116 may be arranged not only inside the integrated monitoring CCTV 100 according to the embodiment of the present invention, but also outside the integrated monitoring CCTV 100, such as the indoor area or the wall of the building. Further, the change in atmospheric pressure measured by the barometer 116 is continuously monitored, and the change in space between the building and the outside is estimated and may then be used as base information for intrusion detection.

In addition, the continuous change in atmospheric pressure information is collected and accumulated by the abnormality detection apparatus 200, and is taken into consideration together with the location information of the integrated monitoring CCTV 100, depending on the embodiment of the present invention, thus enabling more accurate real-time meteorological information and prediction information to be produced.

The abnormality detection system 1000 according to the embodiment of the present invention may determine whether and where an abnormal situation, such as an explosion, has occurred by analyzing the installation location information and the installation direction information, included in the monitoring information transmitted from multiple integrated monitoring CCTVs. The abnormality detection system 1000 according to the embodiment of the present invention may further determine whether and where an explosion has occurred by further considering atmospheric pressure information contained in the above-described monitoring information. Here, since the method for determining whether and where an explosion has occurred will be described in detail later with reference to FIGS. 4 to 6B, an additional description thereof will be omitted.

Figure 4:
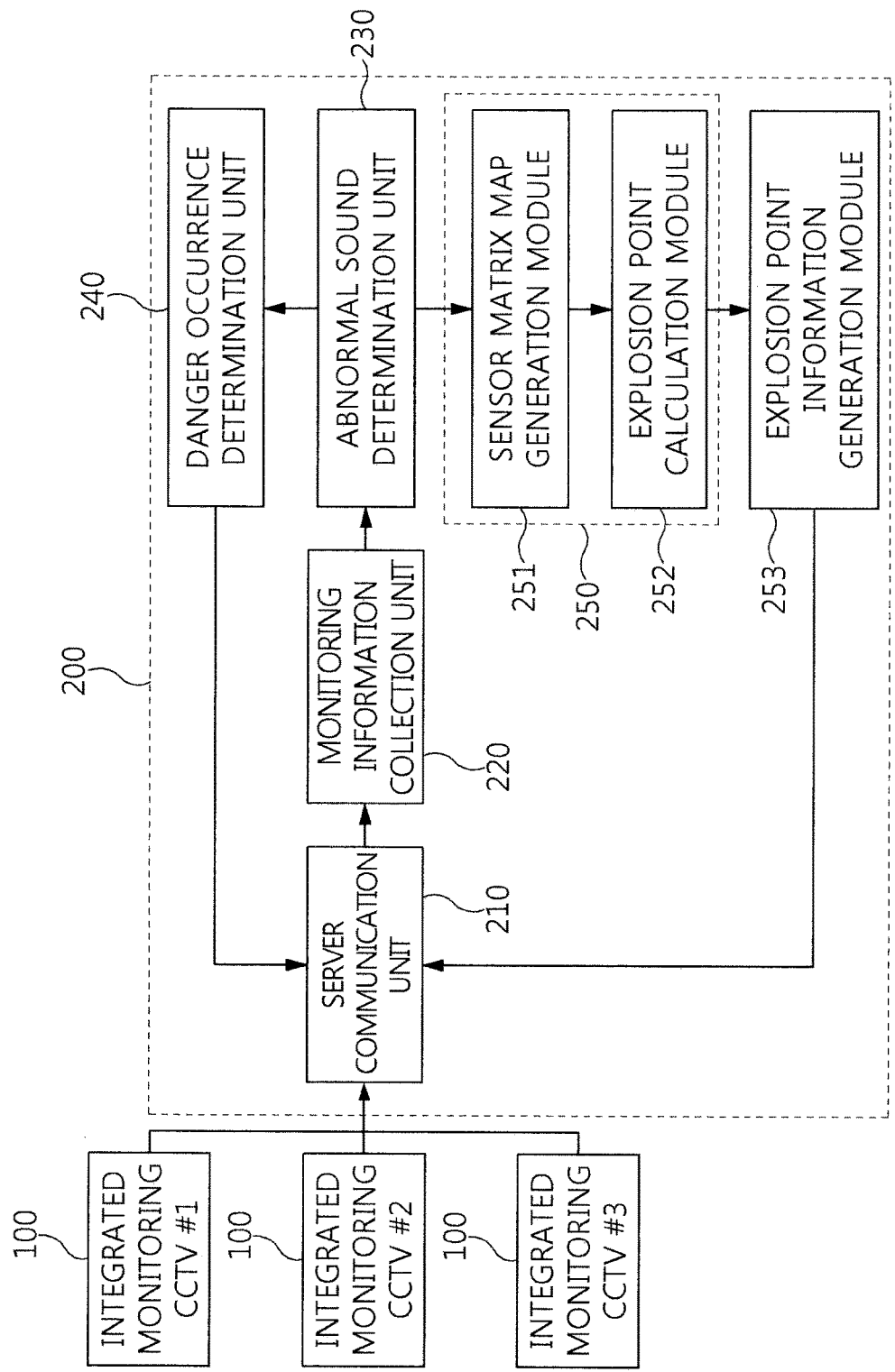
FIG. 4 is a block diagram showing an abnormality detection apparatus according to an embodiment of the present invention.

FIG. 4 is a block diagram showing an abnormality detection apparatus 200 according to an embodiment of the present invention. Below, the abnormality detection apparatus 200 according to the embodiment of the present invention will be described in detail with reference to FIG. 4. As described above, the abnormality detection apparatus 200 according to the embodiment of the present invention functions to determine, based on the monitoring information transmitted from the integrated monitoring CCTVs 100, whether an abnormality has occurred in the monitoring area of the corresponding integrated monitoring CCTV 100.

Figure 5:
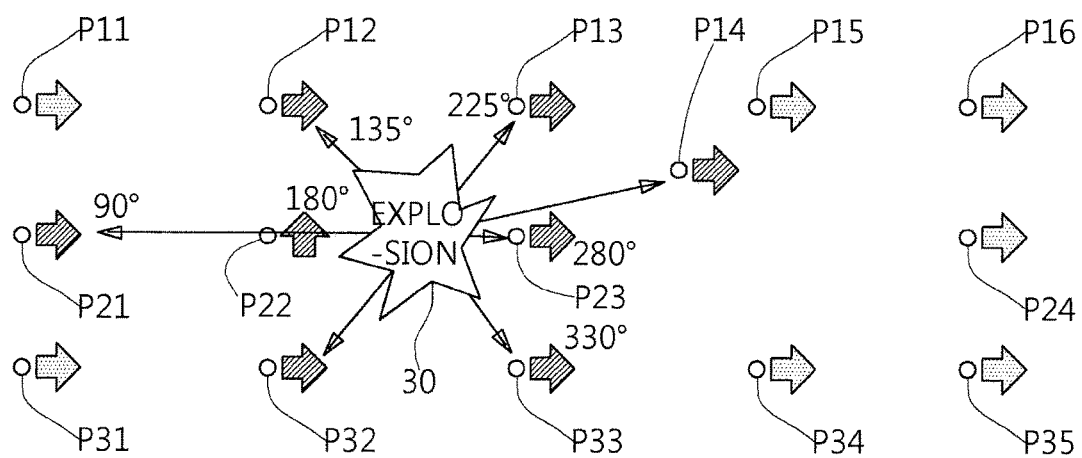
FIG. 5 and FIGS. 6A and 6B are conceptual diagrams showing an explosion location calculation method using the abnormality detection apparatus according to an embodiment of the present invention.
Figure 6A:
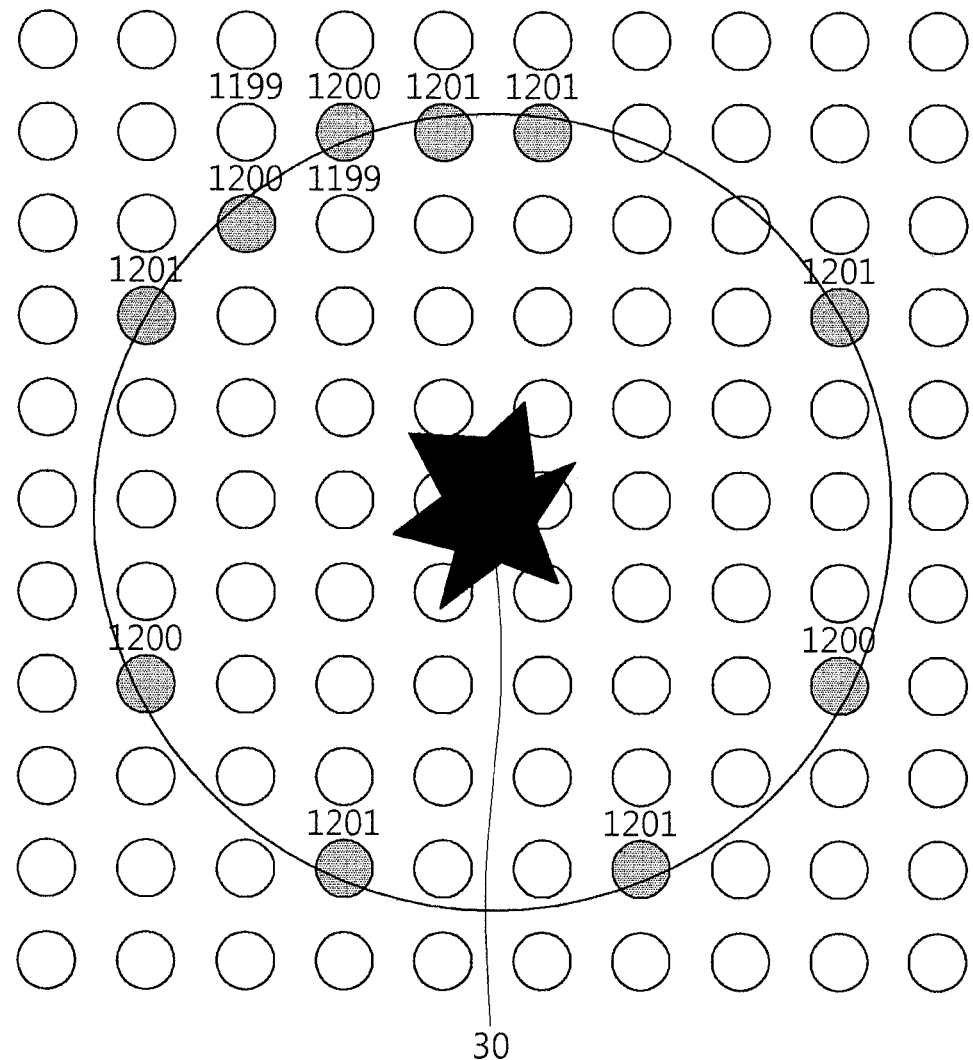
Figure 6B:
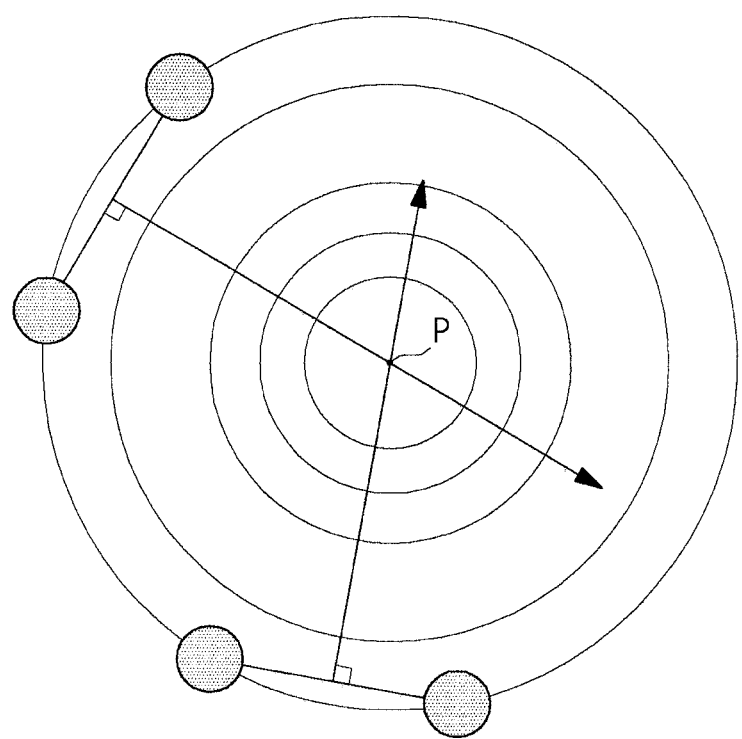

Further, the abnormality detection apparatus 200 according to the embodiment of the present invention functions to accurately check whether and where an abnormal situation, such as an explosion, has occurred by analyzing the monitoring information transmitted from the integrated monitoring CCTVs 100. For example, the abnormality detection apparatus 200 according to the embodiment of the present invention may be configured to include a server communication unit 210, a monitoring information collection unit 220, an abnormal sound determination unit 230, a danger occurrence determination unit 240, and an explosion occurrence determination unit 250. In the following description, the monitoring information collection unit 220, the abnormal sound determination unit 230, the danger occurrence determination unit 240, and the explosion occurrence determination unit 250 denote components that are classified according to their functions to facilitate description of the present invention. The motoring information collection unit 220, the abnormal sound determination unit 230, the danger occurrence determination unit 240, and the explosion occurrence determination unit 250 may also be configured to perform the operations thereof through a single processing device without being separately classified. Further, in FIG. 4, although the number of integrated monitoring CCTVs 100 is shown as 3, this is only an example and is not limited to a specific number, as shown in FIG. 5, FIG. 6A and FIG. 6B.

First, the monitoring information collection unit 220 functions to collect monitoring information received through the server communication unit 210. Here, the monitoring information may include video information and sound information detected by the integrated monitoring CCTVs 100, together with time information indicating the time of detection. The monitoring information may further include the installation location information and installation direction information of the corresponding integrated monitoring CCTVs 100 and atmospheric pressure information in order to determine whether and where an abnormal situation such as an explosion has occurred.

The abnormal sound determination unit 230 functions to determine, based on sound information included in the monitoring information collected through the monitoring information collection unit 220, whether an abnormal situation has occurred. As described above, the abnormal situation may include a scream, a horn, a vehicle accident, breakage of a glass window, an explosion, etc., and may further include additional abnormal situations. Accordingly, the abnormal sound determination unit 230 may determine the occurrence or non-occurrence of an abnormal situation and the type of abnormal situation by comparing the sound information collected by the monitoring information collection unit 220 with sound data stored in a server storage unit (not shown). Here, if it is determined that the abnormal situation is an explosion, the abnormal sound determination unit 230 transfers control to the explosion occurrence determination unit 250; otherwise, it transfers control to the danger occurrence determination unit 240.

Here, the danger occurrence determination unit 240 is classified as a component for performing control when it is possible to determine whether an abnormal situation has occurred and to enable response to the abnormal situation using monitoring information transmitted only from a single integrated monitoring CCTV 100. The explosion occurrence determination unit 250 is classified as a component for performing control required to determine whether an abnormal situation has occurred and enable response to the abnormal situation when pieces of monitoring information transmitted from multiple integrated monitoring CCTVs 100 are analyzed. That is, schemes for the danger occurrence determination unit 240 and the explosion occurrence determination unit 250 are classified such that the danger occurrence determination unit 240 determines an abnormal situation, such as a scream, a horn, a vehicle accident, or breakage of a glass window, using only monitoring information transmitted from the single integrated monitoring CCTV 100, and the explosion occurrence determination unit 250 determines an abnormal situation by analyzing multiple pieces of monitoring information.

The danger occurrence determination unit 240 functions to determine whether a dangerous situation has occurred, based on the above-described monitoring information. In detail, the danger occurrence determination unit 240 functions to determine whether an abnormal situation, such as a scream, a horn, a vehicle accident, or breakage of a glass window, has occurred based on the sound information, to analyze a motion pattern or the like by analyzing video information, and then to determine whether a violent situation or the like has occurred based on the results of analysis. As described above, the danger occurrence determination unit 240 may accurately determine the occurrence or non-occurrence of an abnormal situation, the type of abnormal situation, etc. by comparing preset determination data with sound information, and may determine the presence of a dangerous situation by comparing a motion pattern extracted from the video information with a preset dangerous motion pattern. When a dangerous situation is detected in this way, a warning signal is transmitted to the corresponding integrated monitoring CCTV 100, thus enabling the integrated monitoring CCTV 100 to broadcast a warning. Further, the corresponding danger may be solved via association with an external system (e.g. a fire station, security company, or police station system).

The explosion occurrence determination unit 250 functions to determine whether an explosion has occurred using the pieces of monitoring information transmitted from multiple integrated monitoring CCTVs 100 and to detect the location of the explosion. Here, it may be difficult to detect the explosion through the explosion occurrence determination unit 250 using only the above-described sound information. The reason for this is that, when an explosion occurs, integrated monitoring CCTVs, located near the point of the explosion, may malfunction or may break down due to a phenomenon such as wind pressure occurring together with the explosion. Accordingly, the explosion occurrence determination unit 250 according to the embodiment of the present invention may detect whether and where an explosion has occurred based on continuous changes in the atmospheric pressure information, as well as the above-described sound information.

The method for calculating the point of an explosion, performed by the explosion occurrence determination unit 250, uses a scheme for generating a sensor matrix map, based on the installation location information and installation direction information of the multiple integrated monitoring CCTVs 100, and calculating the point of an explosion based on the sensor matrix map. For this, the explosion occurrence determination unit 250 may be configured to include a sensor matrix map generation module 251, an explosion point calculation module 252, and an explosion point information generation module 253. First, an example of the sensor matrix map generated by the sensor matrix map generation module 251 is illustrated in FIG. 5.

FIG. 5 illustrates an example of the sensor matrix map generated by the abnormality detection apparatus 200 according to an embodiment of the present invention. In FIG. 5, portions indicated by points (p11 to p15, p21 to p25, and p31 to p35) indicate respective multiple integrated monitoring CCTVs 100, and the locations of the points may be generated based on installation location information. Further, respective multiple integrated monitoring CCTVs may have different installation directions depending on the installation environment thereof, and thus the direction information of the corresponding integrated monitoring CCTV may also be indicated on each point.

It is assumed that an explosion occurs at a point 30. When the explosion occurs at the point 30, integrated monitoring CCTVs located near the point 30 acquire abnormal sound information attributable to the explosion, and transmit the acquired abnormal sound information to the abnormality detection apparatus 200. Here, the explosion point calculation module 252 included in the abnormality detection apparatus 200 aggregates pieces of sound information including the direction of occurrence of sounds transmitted from respective integrated monitoring CCTVs, and applies the aggregated sound information to triangulation, thus enabling the point at which sounds are produced to be accurately calculated. Here, the triangulation itself may make the gist of the present invention obscure, and thus an additional description thereof will be omitted.

When the location of an explosion is calculated by the explosion point calculation module 252, the explosion point information generation module 253 generates explosion point information using the calculated explosion point.

Further, as described above, when an explosion, among the types of abnormal situation, occurs, atmospheric pressure near the explosion point also changes while sounds attributable to the explosion are present. More specifically, when an explosion occurs, the shapes of concentric circles expand around the center of the explosion, and thus the ambient atmospheric pressure changes. Accordingly, each of integrated monitoring CCTVs according to the embodiment of the present invention may be configured to further include a barometer in consideration of the above characteristics, and may transmit monitoring information to the abnormality detection apparatus 200, with atmospheric pressure information included in the monitoring information. A description thereof will be made with reference to FIG. 6A.

Similar to FIG. 5, points indicated in FIG. 6A denote a sensor matrix map generated based on the installation location information of the integrated monitoring CCTVs. As described above, when an explosion occurs, ambient air around the point of the explosion is subjected to a change in the atmospheric pressure. That is, the change in the atmospheric pressure attributable to the explosion is propagated as a concentric change in atmospheric pressure. Accordingly, the point of the explosion, the strength of explosive power, and the range of damage may be estimated based on the monitoring information that includes the installation location information and the atmospheric pressure information, which are transmitted from the integrated monitoring CCTVs 100 according to the embodiment of the present invention.

For example, as shown in FIG. 6A, respective integrated monitoring CCTVs, for which rapid variation appears at a specific time, transmit atmospheric pressure information detected by the respective integrated monitoring CCTVs to the abnormality detection apparatus 200. Here, the abnormality detection apparatus 200 combines the atmospheric pressure detected by each integrated monitoring CCTV, the time, and installation location information with each other through the explosion occurrence determination unit 250. Based on the pieces of location information of respective integrated monitoring CCTVs, when pieces of atmospheric pressure information measured at the identical time are combined with each other, concentric circles may be formed, as shown in FIG. 6A. The explosion occurrence determination unit 250 may determine the center of the concentric circles to be the point of the explosion.

Further, as another example, a method of calculating the point of an explosion is illustrated in FIG. 6B. Similar to the above example, the explosion occurrence determination unit 250 may combine the atmospheric pressures detected by the respective integrated monitoring CCTVs, the times, and installation location information of the CCTVs with each other. Here, the explosion occurrence determination unit 250 may determine that two integrated monitoring CCTVs in which a change in atmospheric pressure simultaneously occurs are present on a single concentric circle.

Accordingly, the abnormality detection apparatus 200 may classify integrated monitoring CCTVs, which detect the change in atmospheric pressure at the identical time, into two groups, and may set a virtual line for connecting the integrated monitoring CCTVs belonging to the same group. Thereafter, the explosion occurrence determination unit 250 further sets vertical virtual lines, which are perpendicular to respective virtual lines, and may estimate the point at which the vertical virtual lines in different groups meet to be the location at which an explosion has occurred.

In other words, if it is determined that the change in atmospheric pressure, which is included in the atmospheric pressure information, among the pieces of monitoring information transmitted from the multiple integrated monitoring CCTVs, is equal to or greater than a preset explosion determination value, the explosion occurrence determination unit 250 may determine that an explosion has occurred, and may accurately calculate the point at which the explosion has occurred, using the method described with reference to FIGS. 6A and 6B.

An abnormality detection system including the integrated monitoring CCTVs 100 and the abnormality detection apparatus 200 according to the embodiment of the present invention is advantageous in that the technical restriction of existing CCTVs may be overcome, an explosion may be detected, and the location of the explosion may be determined by detecting sounds and generating panoramic view images. Further, the abnormality detection system according to the present invention may additionally monitor flying objects using both the sound detection module 113 and the video monitoring module 114 included in each integrated monitoring CCTV 100. An example of this operation is illustrated in FIGS. 7 and 8.

Figure 7:
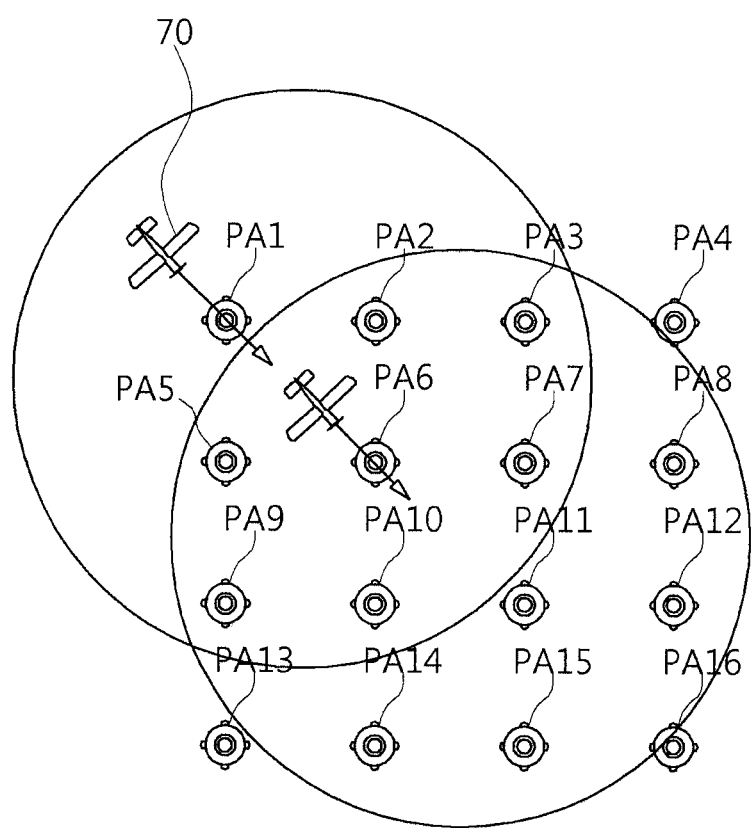
FIGS. 7 and 8 are conceptual diagrams showing a flying object monitoring method using the abnormality detection apparatus according to another embodiment of the present invention.
Figure 8:
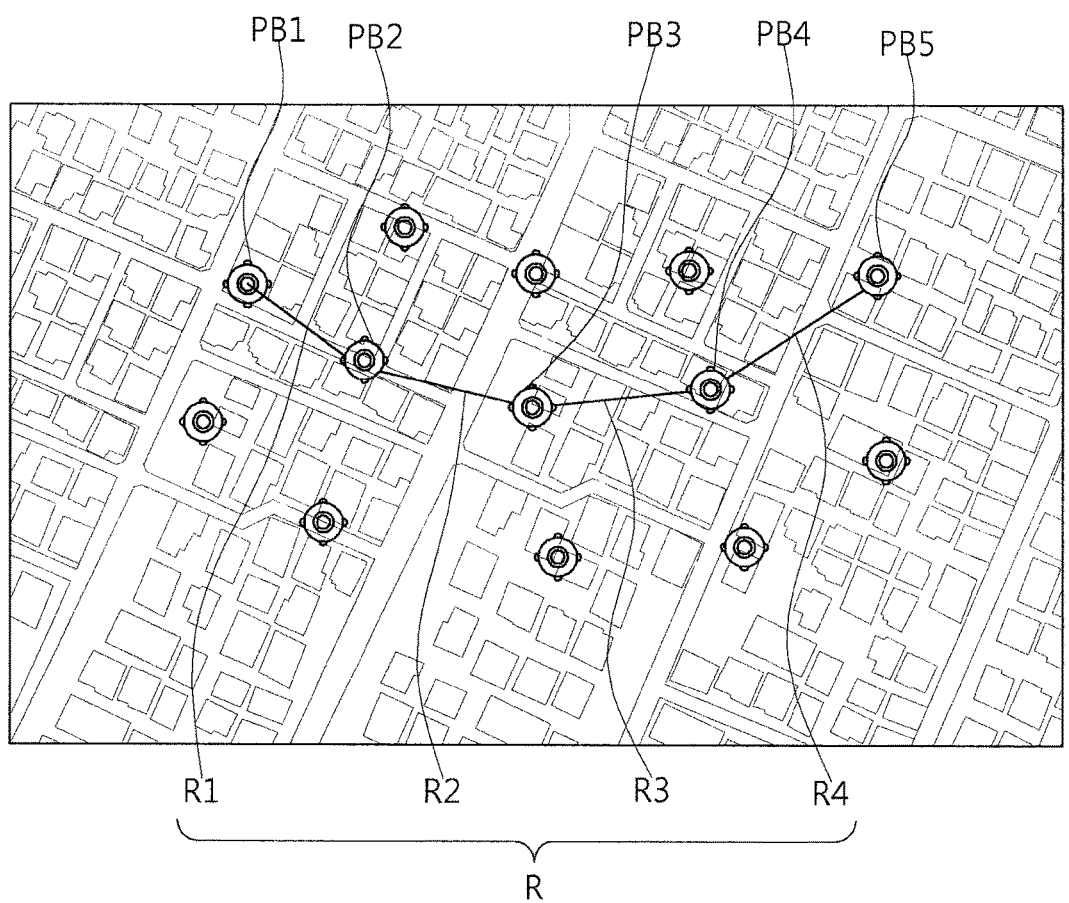

FIGS. 7 and 8 are conceptual diagrams showing a method for monitoring a flying object using the abnormality detection apparatus according to another embodiment of the present invention. As described above, an integrated monitoring CCTV according to another embodiment of the present invention may further monitor a flying object by detecting the sounds of the flying object that passes through the sky. Here, the flying object may include a low-altitude airplane, a drone, etc.

However, the flying object may be observed only for a short period of time due to the motion of the flying object. Accordingly, the abnormality detection apparatus according to another embodiment of the present invention may use installation location information and sound information, which are included in pieces of monitoring information transmitted from multiple integrated monitoring CCTVs, similar to the above-described explosion detection method. That is, as shown in FIGS. 7 and 8, the abnormality detection apparatus may generate a sensor matrix map and may track a flying object based on the collected installation location information and sound information. In this case, even if a single integrated monitoring CCTV fails to track the direction of travel of the flying object, when other integrated monitoring CCTVs detect the flying object, the trajectory of the flying object may be tracked based on the installation location information and time information.

Accordingly, as shown in FIGS. 7 and 8, the current time, current coordinates, engine sound features (frequency/strength or the like), the direction of appearance, the direction of travel, the direction of disappearance, etc. may be derived. Each of the integrated monitoring CCTVs according to the embodiment of the present invention may further include cameras for monitoring the sky so as to detect the state of the sky, and multiple microphones. Such multiple microphones may also be implemented in the form of an array. Next, an example in which a flying object is detected using the abnormality detection system according to another embodiment of the present invention will be described in detail below.

First, when a flying object 70 appears, an integrated monitoring CCTV PA1 located adjacent to the flying object 70 detects the flying object 70. Here, the integrated monitoring CCTV PA1 notifies the abnormality detection apparatus according to this embodiment of the present invention of monitoring information that includes both its own installation location information and sound information including the direction of occurrence of sounds. In this case, the abnormality detection apparatus may transmit a control signal to integrated monitoring CCTVs PA2, PA3, PA5, PA6, PA7, PA9, and PA10, which may be included in the direction of travel of the flying object 70, so as to improve the sensitivity of detection. After a preset period of time, the abnormality detection apparatus transmits monitoring information of the flying object, received from an integrated monitoring CCTV which additionally detects the flying object, to the abnormality detection apparatus, thus enabling continuous monitoring to be performed. When continuous monitoring is performed in this way, the movement path of the flying object may be detected, as indicated by R1 to R4 in FIG. 8.

Figure 9:
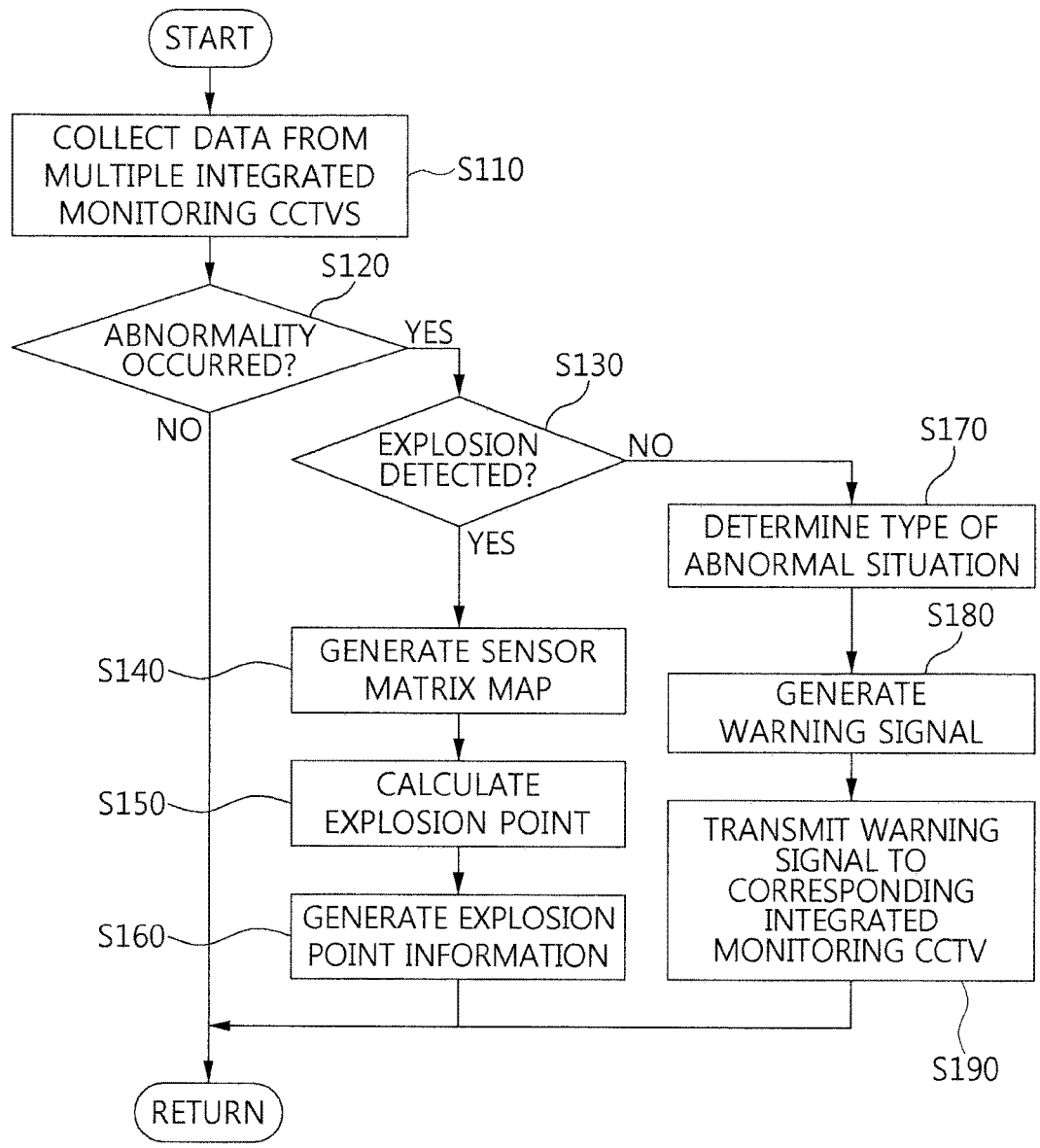
FIG. 9 is a flowchart showing a method for operating the abnormality detection apparatus according to an embodiment of the present invention.

FIG. 9 is a flowchart showing a method for operating the abnormality detection apparatus according to an embodiment of the present invention. Below, the method for operating the abnormality detection apparatus according to the embodiment of the present invention will be described in detail. In the following description, repeated description identical to the above description will be omitted.

First, by the monitoring information collection unit, pieces of data are collected from multiple integrated monitoring CCTVs through the server communication unit at step S110. As described above, the abnormality detection apparatus according to the embodiment of the present invention detects an abnormal situation, such as a scream, a horn, a vehicle accident, the breakage of a glass window, or an explosion, and enables response to the abnormal situation. Here, the scream, horn, vehicle accident, the breakage of a glass window, or an explosion may be determined using only a single integrated monitoring CCTV, but the analysis of monitoring information transmitted from multiple integrated monitoring CCTVs is required in order to accurately determine the location at which an abnormal situation, such as an explosion, occurs. Since this operation has been described in detail above, an additional description thereof will be omitted. Further, the monitoring information may include the installation location information and installation direction information of respective integrated monitoring CCTVs, as well as the sound information, video information, and time information, in order to calculate the point at which an abnormal situation occurs. In addition, the monitoring information may further include atmospheric pressure information so as to detect the location at which an illegal intrusion into a building or an explosion occurs.

Thereafter, by the abnormal sound determination unit, it is determined, based on sound information included in the monitoring information collected at step S110, whether an abnormal situation has occurred at step S120. More specifically, step S120 may be performed by comparing the sound information with pre-stored determination sound data. That is, when the pattern of sounds included in the sound information is included in the determination sound data, it may be determined that an abnormal situation has occurred. As a result of the determination at step S120, if the abnormal situation is determined to have occurred, control proceeds to step S130. Otherwise, control proceeds to a return block, thus enabling the above-described procedure to be performed again.

At step S130, by the abnormal sound determination unit, it is determined whether the corresponding abnormal situation is an explosion. As described above, the remaining abnormal situations, other than the explosion, may be determined only by analyzing the monitoring information transmitted from the corresponding integrated monitoring CCTV, but an association between multiple integrated monitoring CCTVs is required in order to determine the location of an abnormal situation, such as an explosion. Accordingly, determination at step S130 is required. When it is determined at step S130 that an explosion has been detected, control proceeds to step S140; otherwise, control proceeds to step S170.

Steps S140 to S160 are performed by the explosion occurrence determination unit, and indicate the step of calculating the point of an explosion when an explosion occurs, and the step of generating explosion point information.

To generate such explosion point information, a sensor matrix map is first generated at step S140. That is, as described above with reference to FIGS. 5, 6A, and 6B, the sensor matrix map may be generated based on the installation location information and the installation direction information of the multiple integrated monitoring CCTVs. Here, the sensor matrix map may be generated in the form of a two-dimensional (2D) or a three-dimensional (3D) map.

Thereafter, the point of the explosion is calculated by analyzing pieces of monitoring information transmitted from the multiple integrated monitoring CCTVs at step S150. As described above, monitoring information includes information about the times at which the sound information, video information, etc. are collected. Step S150 is configured to perform analysis based on the pieces of information collected at identical time with respect to the time information. Here, the method for calculating the explosion point may be implemented using triangulation based on sound information and a scheme based on the atmospheric pressure. Individual methods for calculating the explosion point have been described above with reference to FIGS. 5, 6A, and 6B, and thus an additional description thereof will be omitted.

When the calculation of the explosion point is completed at step S150, control proceeds to step S160, at which the explosion point information is generated. This explosion point information is transmitted to an external system (e.g. a fire station system) or the like, thus enabling response to the abnormal situation.

Step S170 is performed by the dangerous situation determination unit when an explosion is not detected, and is configured to determine the type of abnormal situation. As described above, step S170 enables the type of abnormal situation to be determined by comparing determination sound data with sound information.

When the type of abnormal situation is determined at step S170, a warning signal may be generated at step S180 and may be transmitted to the corresponding integrated monitoring CCTV at step S190. Further, at step S190, the corresponding signal is transmitted to an external system (e.g. a police station system or a security company system), rather than simply broadcasting a warning, thus enabling response to the dangerous situation.

Figure 10:
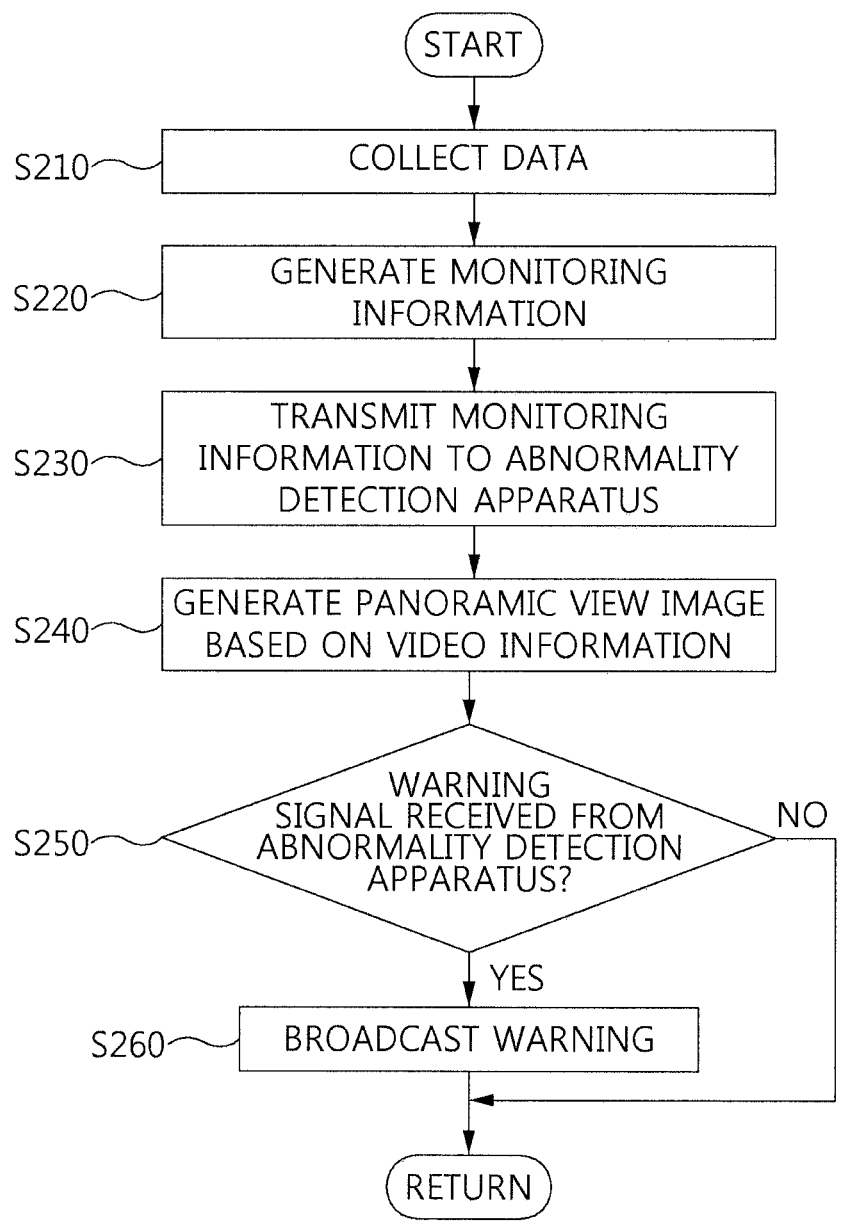
FIG. 10 is a flowchart showing a method for operating an integrated monitoring CCTV according to an embodiment of the present invention.

FIG. 10 is a flowchart showing a method for operating the integrated monitoring CCTV according to an embodiment of the present invention. Below, the method for operating the integrated monitoring CCTV according to the embodiment of the present invention will be described with reference to FIG. 10.

First, by the detected information collection unit, data is collected at step S210. As described above, data collected at step S210 may include sound information and video information of a monitoring area, and may further include the installation location and installation direction information of the integrated monitoring CCTVs, time information, atmospheric pressure information, etc. Here, the description of pieces of information collected at step S210 has been made above, and thus an additional description thereof will be omitted.

Thereafter, monitoring information is generated, based on the information collected at step S210, at step S220, and the generated monitoring information is transmitted to the abnormality detection apparatus at step S230. Here, steps S210 to S230 may be repeatedly performed, and the monitoring information generated at step S220 may be transmitted in real time at step S230.

Next, by the panoramic view generation unit, a panoramic view image is generated based on the video information at step S240. As described above, the monitoring information at step S230 is transmitted in real time to the abnormality detection apparatus, but it is difficult to transmit the panoramic view image generated at step S240 to the abnormality detection apparatus in real time due to the high band thereof. Accordingly, the panoramic view image generated at step S240 is transmitted only when a separate request is received from the abnormality detection apparatus.

Thereafter, it is determined whether a warning signal has been received from the abnormality detection apparatus at step S250. As described above, the abnormality detection apparatus may classify abnormal situations, such as a scream, a horn, a vehicle accident, breakage of a glass window, and an explosion, determine the types thereof, and transmit a warning signal so that a warning based on the corresponding abnormal situation is broadcasted through the integrated monitoring CCTVs. When the warning signal is received, the warning is broadcasted in response to the warning signal through the warning broadcasting unit at step S260. In contrast, when it is determined at step S250 that no warning signal is received, control proceeds to a return block, and thus the above-described procedure is performed again.

The integrated monitoring CCTV, the abnormality detection apparatus, and the method for operating the apparatus according to the present invention are advantageous in that the detection of abnormal sound sources and the collection of information using sensors, as well as the collection of CCTV videos, are performed, thus improving the accuracy of determination of an abnormal situation occurring in a monitoring area and eliminating blind spots in integrated monitoring CCTVs via the generation of panoramic view images.

Further, the integrated monitoring CCTV, the abnormality detection apparatus, and the method for operating the apparatus according to the present invention are advantageous in that the situation of an explosion and a flying object, such as a drone, may be detected, and the location thereof may be checked.

As described above, optimal embodiments of the present invention have been disclosed in the drawings and the specification. Although specific terms have been used in the present specification, these are merely intended to describe the present invention and are not intended to limit the meanings thereof or the scope of the present invention described in the accompanying claims. Therefore, those skilled in the art will appreciate that various modifications and other equivalent embodiments are possible from the embodiments. Therefore, the technical scope of the present invention should be defined by the technical spirit of the claims.

What is claimed is:

1. An abnormality detection apparatus, comprising:
   a monitoring information collection unit for collecting monitoring information that includes location information, sound information and time information of a monitoring area from at least one integrated monitoring Closed Circuit Television (CCTV) including multiple microphones; and
   an abnormal sound determination unit for determining whether an abnormality has occurred in the monitoring area, based on the sound information of the monitoring area,
   wherein the monitoring information includes information about an installation location and an installation direction of the integrated monitoring CCTV,
   wherein the abnormality detection apparatus further comprises an explosion occurrence determination unit for, based on information about installation locations and installation directions of multiple integrated monitoring CCTVs transmitted from the multiple integrated monitoring CCTVs, generating a sensor matrix map for the multiple integrated monitoring CCTVs and calculating a location of occurrence of an abnormal sound based on the sensor matrix map when the abnormal sound occurs,
   wherein the monitoring information further includes atmospheric pressure information of the monitoring area generated based on a barometer installed in each integrated monitoring CCTV,
   wherein the explosion occurrence determination unit is configured to, when a change in atmospheric pressure included in atmospheric pressure information transmitted from the multiple integrated monitoring CCTVs is equal to or greater than a preset explosion determination value, determine that an explosion has occurred, and
   wherein the explosion occurrence determination unit is configured to, if it is determined that the explosion has occurred, detect integrated monitoring CCTVs having identical changes in atmospheric pressure at identical time, based on the time information and the atmospheric pressure information, form concentric circles by connecting the integrated monitoring CCTVs having identical changes in atmospheric pressure at identical time based on the installation location information, and determine a center of the concentric circles to be a point of the explosion.

2. The abnormality detection apparatus of claim 1, wherein the sound information of the monitoring area includes information about a direction of occurrence of sounds detected by multiple microphones included in the integrated monitoring CCTV installed in the monitoring area.

3. The abnormality detection apparatus of claim 2, wherein the explosion occurrence determination unit calculates the location of occurrence of the abnormal sound by applying triangulation to the sensor matrix map.

4. An abnormality detection apparatus, comprising:
   a monitoring information collection unit for collecting monitoring information that includes location information, sound information and time information of a monitoring area from at least one integrated monitoring Closed Circuit Television (CCTV) including multiple microphones; and
   an abnormal sound determination unit for determining whether an abnormality has occurred in the monitoring area, based on the sound information of the monitoring area,
   wherein the monitoring information includes information about an installation location and an installation direction of the integrated monitoring CCTV,
   wherein the abnormality detection apparatus further comprises an explosion occurrence determination unit for, based on information about installation locations and installation directions of multiple integrated monitoring CCTVs transmitted from the multiple integrated monitoring CCTVs, generating a sensor matrix map for the multiple integrated monitoring CCTVs and calculating a location of occurrence of an abnormal sound based on the sensor matrix map when the abnormal sound occurs,
   wherein the monitoring information further includes atmospheric pressure information of the monitoring area generated based on a barometer installed in each integrated monitoring CCTV,
   wherein the explosion occurrence determination unit is configured to, when a change in atmospheric pressure included in atmospheric pressure information transmitted from the multiple integrated monitoring CCTVs is equal to or greater than a preset explosion determination value, determine that an explosion has occurred, and
   wherein the explosion occurrence determination unit is configured to, if it is determined that the explosion has occurred, classify integrated monitoring CCTVs having identical changes in atmospheric pressure at identical time into two groups based on the time information and the atmospheric pressure information, set a virtual line for connecting integrated monitoring CCTVs belonging to an identical group and a vertical virtual line perpendicular to the virtual line, and determine a point at which vertical virtual lines belonging to different groups meet to be a point of the explosion.

5. A method for operating an abnormality detection apparatus, comprising:
   collecting monitoring information that includes location information, sound information and time information of a monitoring area from at least one integrated monitoring Closed Circuit Television (CCTV) including multiple microphones; and
   determining whether an abnormality has occurred in the monitoring area, based on the sound information of the monitoring area,
   wherein the monitoring information includes information about an installation location and an installation direction of the integrated monitoring CCTV, and the monitoring information further includes atmospheric pressure information of the monitoring area generated based on a barometer installed in each integrated monitoring CCTV, and
   wherein the method further comprises:
   generating a sensor matrix map for the multiple integrated monitoring CCTVs, based on information about installation locations and installation directions of multiple integrated monitoring CCTVs transmitted from the multiple integrated monitoring CCTVs;
   calculating a location of occurrence of an abnormal sound based on the sensor matrix map when the abnormal sound occurs;
   determining that an explosion has occurred when a change in atmospheric pressure included in atmospheric pressure information transmitted from the multiple integrated monitoring CCTVs, is equal to or greater than a preset explosion determination value;
   when it is determined that the explosion has occurred, detecting integrated monitoring CCTVs having identical changes in atmospheric pressure at identical time based on installation location information, time information, and atmospheric pressure information;
   forming concentric circles by connecting integrated monitoring CCTVs having identical changes in atmospheric pressure at identical time; and
   determining a center of the concentric circles to be a point of the explosion.

6. The method for operating the abnormality detection apparatus of claim 5, wherein the sound information of the monitoring area includes information about a direction of occurrence of sounds detected by multiple microphones included in the integrated monitoring CCTV installed in the monitoring area.

7. The method for operating the abnormality detection apparatus of claim 6, wherein calculating the location of occurrence of the abnormal sound is performed by applying triangulation to the sensor matrix map.

8. A method for operating an abnormality detection apparatus, comprising:
   collecting monitoring information that includes location information, sound information and time information of a monitoring area from at least one integrated monitoring Closed Circuit Television (CCTV) including multiple microphones; and
   determining whether an abnormality has occurred in the monitoring area, based on the sound information of the monitoring area,
   wherein the monitoring information includes information about an installation location and an installation direction of the integrated monitoring CCTV, and the monitoring information further includes atmospheric pressure information of the monitoring area generated based on a barometer installed in each integrated monitoring CCTV, and
   wherein the method further comprises:
   generating a sensor matrix map for the multiple integrated monitoring CCTVs, based on information about installation locations and installation directions of multiple integrated monitoring CCTVs transmitted from the multiple integrated monitoring CCTVs;
   calculating a location of occurrence of an abnormal sound based on the sensor matrix map when the abnormal sound occurs;
   determining that an explosion has occurred when a change in atmospheric pressure included in atmospheric pressure information transmitted from the multiple integrated monitoring CCTVs is equal to or greater than a preset explosion determination value;
   when it is determined that the explosion has occurred, classifying integrated monitoring CCTVs having identical changes in atmospheric pressure at identical time into two groups based on the time information and the atmospheric pressure information;
   setting a virtual line for connecting integrated monitoring CCTVs belonging to an identical group and a vertical virtual line perpendicular to the virtual line; and
   determining a point at which vertical virtual lines belonging to different groups meet to be a point of the explosion.

9. The method according to claim 8, wherein the sound information of the monitoring area includes information about a direction of occurrence of sounds detected by multiple microphones included in the integrated monitoring CCTV installed in the monitoring area.

10. The method according to claim 8, wherein calculating the location of occurrence of the abnormal sound is performed by applying triangulation to the sensor matrix map.

11. The abnormality detection apparatus of claim 4, wherein the sound information of the monitoring area includes information about a direction of occurrence of sounds detected by multiple microphones included in the integrated monitoring CCTV installed in the monitoring area.

12. The abnormality detection apparatus of claim 4, wherein the explosion occurrence determination unit calculates the location of occurrence of the abnormal sound by applying triangulation to the sensor matrix map.

* * * * *